(12) United States Patent
Uno et al.

(10) Patent No.: US 8,529,817 B2
(45) Date of Patent: Sep. 10, 2013

(54) STRETCHED THERMOPLASTIC RESIN FOAM SHEET AND PROCESS FOR PRODUCTION OF THE SAME

(75) Inventors: Takumei Uno, Hasuda (JP); Eiji Tateo, Hasuda (JP); Futoshi Kanazawa, Hasuda (JP)

(73) Assignee: Sekisui Chemical Co., Ltd., Osaka (JP)

( * ) Notice: Subject to any disclaimer, the term of this patent is extended or adjusted under 35 U.S.C. 154(b) by 381 days.

(21) Appl. No.: 12/734,004

(22) PCT Filed: Sep. 26, 2008

(86) PCT No.: PCT/JP2008/067561
§ 371 (c)(1),
(2), (4) Date: May 7, 2010

(87) PCT Pub. No.: WO2009/044690
PCT Pub. Date: Apr. 9, 2009

(65) Prior Publication Data
US 2010/0249258 A1    Sep. 30, 2010

(30) Foreign Application Priority Data
Oct. 2, 2007 (JP) ................................. 2007-258588

(51) Int. Cl.
| B29C 55/00 | (2006.01) |
| B29C 55/08 | (2006.01) |
| B29C 71/02 | (2006.01) |
| B29C 44/34 | (2006.01) |
| B29C 44/56 | (2006.01) |

(52) U.S. Cl.
CPC .................................. B29C 44/5627 (2013.01)
USPC ......... 264/288.8; 264/51; 264/54; 264/210.7; 264/211.18; 264/211.2; 264/235.6; 264/235.8; 264/290.2; 264/294; 521/142

(58) Field of Classification Search
None
See application file for complete search history.

(56) References Cited

U.S. PATENT DOCUMENTS

| 3,843,761 | A | * | 10/1974 | Bierenbaum et al. ......... 264/154 |
| 4,264,672 | A | * | 4/1981 | Taylor-Brown et al. ....... 428/339 |
| 4,871,784 | A | * | 10/1989 | Otonari et al. ................. 521/138 |
| 5,169,712 | A | * | 12/1992 | Tapp ........................... 428/315.5 |
| 6,767,501 | B1 | * | 7/2004 | Kirjavainen .................... 264/572 |
| 6,793,854 | B1 | * | 9/2004 | Kirjavainen ................... 264/45.9 |
| 2004/0010087 | A1 | * | 1/2004 | Obata et al. .................... 525/240 |
| 2004/0096744 | A1 | * | 5/2004 | Sadamitsu et al. ............. 429/254 |
| 2005/0288383 | A1 | * | 12/2005 | Haas et al. ...................... 521/142 |
| 2006/0177642 | A1 | * | 8/2006 | Tateo et al. .................. 428/304.4 |
| 2007/0264483 | A1 | * | 11/2007 | Ozaki et al. ................. 428/304.4 |
| 2008/0003421 | A1 | | 1/2008 | Matsumura et al. |
| 2009/0008812 | A1 | * | 1/2009 | Kirjavainen .................... 264/51 |

FOREIGN PATENT DOCUMENTS

| JP | 59-62118 | | 4/1984 |
| JP | 2001-100216 | | 4/2001 |
| JP | 2002-47369 | | 2/2002 |
| JP | 2004-323842 | | 11/2004 |
| JP | 2004323842 A | * | 11/2004 |
| JP | 2006-45268 | | 2/2006 |
| WO | 2006/043570 | | 4/2006 |

OTHER PUBLICATIONS

International Search Report issued Dec. 16, 2008 in International (PCT) Application No. PCT/JP2008/067561.

* cited by examiner

*Primary Examiner* — Jeffrey Wollschlager
(74) *Attorney, Agent, or Firm* — Wenderoth, Lind & Ponack, L.L.P.

(57) ABSTRACT

The present invention provides a stretched thermoplastic resin foam sheet that has excellent flexibility even compressed to a thickness as thin as about 0.05 mm, and a method for producing the same. The stretched thermoplastic resin foam sheet of the present invention is producible by stretching a thermoplastic resin foam sheet and has a compressive strength of 1 to 500 kPa as measured in accordance with JIS K6767 when compressed in a thickness direction thereof to a thickness of 0.05 mm. Accordingly, the stretched thermoplastic resin foam sheet has excellent flexibility even compressed to a thickness as thin as about 0.05 mm and is suitably used as a sealing material for a small electronic device such as mobile phones.

1 Claim, No Drawings

STRETCHED THERMOPLASTIC RESIN FOAM SHEET AND PROCESS FOR PRODUCTION OF THE SAME

This application is a U.S. national stage of International Application No. PCT/JP2008/067561 filed Sep. 26, 2008.

TECHNICAL FIELD

The present invention relates to a stretched thermoplastic resin foam sheet and a process for production of the same.

BACKGROUND ART

Thermoplastic resin foam sheets are widely used as sealing materials for filling gaps formed among parts in various products such as imaging equipment including a video movie camera, a digital camera, and a copying machine; electronic devices; mobile phones; housing parts; and automobile parts, with an aim of achieving heat insulation, sound insulation, vibration control, cushioning, watertightness, airtightness and so on.

Various products including mobile phones are now reduced in size and thickness. Along with this trend, the sealing material is used in a very thin state in which the sealing material is compressed in its thickness direction to a thickness of about 0.05 mm. Even in such a state, the sealing material is required to exert excellent sealability.

As such a sealing material, Patent Document 1 discloses a gasket comprising: a substrate consisting of a foam having a hardness of 0.08 to 0.3 kg/cm$^2$ at 25% compression and an elasticity of 0.3 to 0.5 g/cm$^3$; and a plastic film fastened to one surface of the substrate.

However, the gasket has a problem that the flexibility is lowered when compressed to a thickness as thin as about 0.05 mm, resulting in a deteriorated sealability.

Patent Document 1: Japanese Kokai Publication 2001-100216 (JP-A 2001-100216)

DISCLOSURE OF THE INVENTION

Problems to be Solved by the Invention

The present invention provides a stretched thermoplastic resin foam sheet that has excellent flexibility even when compressed to a thickness as thin as about 0.05 mm, and a method for producing the same.

The stretched thermoplastic resin foam sheet of the present invention is produced by stretching a thermoplastic resin foam sheet and has a compressive strength of 1 to 500 kPa as measured in accordance with JIS K6767 when compressed in a thickness direction thereof to a thickness of 0.05 mm.

The thermoplastic resin constituting the stretched thermoplastic resin foam sheet of the present invention is not specifically limited, and polyolefin-based resins such as polyethylene-based resins and polypropylene-based resins are preferably used.

The polyethylene-based resins are not specifically limited. Examples thereof include a linear low-density polyethylene, a low-density polyethylene, a medium-density polyethylene, a high-density polyethylene, an ethylene-α-olefin copolymer containing 50% by weight or more of ethylene, an ethylene-vinyl acetate copolymer containing 50% by weight or more of ethylene, a polyethylene-based resin obtained by using a metallocene compound containing a tetravalent transition metal as a polymerization catalyst. The polyethylene-based resins may be used alone or two or more of them may be used in combination. Examples of an α-olefin constituting an ethylene-α-olefin copolymer include propylene, 1-butene, 1-pentene, 4-methyl-1-pentene, 1-hexene, 1-heptene, and 1-octene.

A linear low-density polyethylene obtained by copolymerizing ethylene and a small amount of α-olefin with use of a metallocene compound containing a tetravalent transition metal as a polymerization catalyst is preferably used as the polyethylene-based resin obtained by using a metallocene compound containing a tetravalent transition metal as a polymerization catalyst.

Examples of the α-olefin include propylene, 1-butene, 1-pentene, 4-methyl-1-pentene, 1-hexene, 1-heptene, and 1-octene.

The metallocene compound generally refers to a compound having a structure in which a transition metal is sandwiched between π-electron unsaturated compounds. An representative example thereof is a bis(cyclopentadienyl) metal complex.

Specific examples of the metallocene compound containing a tetravalent transition metal include a compound in which one or more cyclopentadienyl rings or analogs thereof are present as ligands in a tetravalent transition metal such as titanium, zirconium, nickel, palladium, hafnium, and platinum.

Examples of the ligands include: a cyclopentadienyl ring; a cyclopentadienyl ring substituted by a hydrocarbon, substituted hydrocarbon, or hydrocarbon-substituted metalloid group; a cyclopentadienyl oligomer ring; an indenyl ring; and an indenyl ring substituted by a hydrocarbon, substituted hydrocarbon, or hydrocarbon-substituted metalloid group. In addition to these π-electron unsaturated compounds, as a ligand, a monovalent anion ligand such as chlorine and bromine or, a divalent anion chelate ligand, hydrocarbon, alkoxide, arylamide, aryloxide, amide, arylamide, phosphide, and arylphosphide may be coordinated to a transition metal atom.

Examples of a hydrocarbon group substituting for a cyclopentadienyl ring may include a methyl group, an ethyl group, a propyl group, a butyl group, an isobutyl group, an amyl group, an isoamyl group, a hexyl group, a 2-ethylhexyl group, a heptyl group, an octyl group, a nonyl group, a decyl group, a cetyl group, a phenyl group.

Examples of a metallocene compound containing a tetravalent transition metal include cyclopentadienyltitanium tris(dimethylamide), methylcyclopentadienyltitanium tris(dimethylamide), bis(cyclopentadienyl)titanium dichloride, dimethylsilyltetramethylcyclopentadienyl-t-butylamidezirconium dichloride, dimethylsilyltetramethylcyclopentadienyl-t-butylamidohafnium dichloride, dimethylsilyltetramethylcyclopentadienyl-p-n-butylphenylamidezirconium chloride, methylphenylsilyltetramethylcyclopentadienyl-t-butylamide-hafnium dichloride, indenyltitanium tris(dimethylamide), indenyltitaniumtris(diethylamide), indenyltitanium tris(di-n-propylamide), indenyltitanium bis(di-n-butylamide)(di-n-propylamide), and the like.

The metallocene compound has functions as a catalyst upon polymerization of various olefins with the select of the kind of a metal or a structure of a ligand or with the combination with a particular cocatalyst (promoter). Specifically, polymerization is usually performed in a catalyst system in which methylaluminoxane (MAO), a boron-based compound or the like is added as a cocatalyst to these metallocene compounds. A ratio of a cocatalyst to be used relative to the metallocene compound is preferably 10 to 1,000,000 molar times, more preferably 50 to 5,000 molar times.

A method for polymerizing the polyethylene-based resin is not particularly limited, and examples thereof may include a solution polymerization using an inert medium, a bulk polymerization substantially free of an inert medium, a vapor phase polymerization. A polymerization temperature is usually −100° C. to 300° C., and a polymerization pressure is usually a normal pressure to 100 kg/cm².

In the metallocene compound, active sites have uniform properties and have the same active degree; therefore, evenness is enhanced in a molecular weight, a molecular weight distribution, a composition, a composition distribution and the like of a polymer to be synthesized. Therefore, a polyolefin-based resin polymerized using these metallocene compounds as a polymerization catalyst has a narrow molecular weight distribution and, in the case of a copolymer, the resin has a characteristic that a copolymerization component is introduced in any molecular weight component at an approximately equal percentage.

Examples of the polypropylene-based resin may include polypropylene, and a propylene-α-olefin copolymer containing 50% by weight or more of propylene. These may be used alone, or two or more of them may be used in combination. Examples of an α-olefin constituting a propylene-α-olefin copolymer may include ethylene, 1-butene, 1-pentene, 4-methyl-1-pentene, 1-hexene, 1-heptene, 1-octene, and the like.

The stretched thermoplastic resin foam sheet of the present invention has a compressive strength of 1 to 1500 kPa as measured in accordance with JIS K6767 when compressed in a thickness direction thereof to a thickness of 0.05 mm.

The compressive strength in the stretched thermoplastic resin foam sheet is limited to 1 to 500 kPa, preferably 20 to 500 kPa. When the compressive strength is too low, the sealing performance of the stretched thermoplastic resin foam sheet is deteriorated when used as a sealing material. When the compressive strength is too high, the stretched thermoplastic resin foam sheet cannot be compressed.

The apparent density of the stretched thermoplastic resin foam sheet of the present invention is preferably 0.14 to 0.7 g/cm³, more preferably 0.2 to 0.5 g/cm³. When the apparent density is too low, the sealability, in particular, dust proof ability of the stretched thermoplastic resin foam sheet may be deteriorated when used as a sealing material. When the apparent density is too high, the stretched thermoplastic resin foam sheet may not be compressed. It is to be noted that the apparent density of the stretched thermoplastic resin foam sheet refers to a value as measured in accordance with JIS K6767.

The closed cell ratio of the stretched thermoplastic resin foam sheet of the present invention is preferably 50% or more, more preferably in a range of 50 to 70%. When the closed cell ratio is too small, the sealability, in particular, water proof ability of the stretched thermoplastic resin foam sheet is deteriorated when used as a sealing material. When the closed cell ratio is too big, the flexibility of the stretched thermoplastic resin foam sheet may be deteriorated.

The closed cell ratio of the stretched thermoplastic resin foam sheet is measured as follows. First, a square-shaped test sample having a size of 5 cm×5 cm and a constant thickness is cut out of the stretched thermoplastic resin foam sheet. Then, the thickness of the test sample is measured to determine an apparent volume $V_1$ of the test sample, and a weight $W_1$ is measured.

Next, the value obtained above is substituted in the following formula to determine a volume $V_2$ of foams. Here, the density of the resin constituting the test sample is represented as $\rho$ g/cm³.

$$\text{Volume } V_2 \text{ of foams} = V_1 - W_1/\rho$$

The test piece is immersed in distilled water such that the distance between the test piece and the surface of the water is to be 100 mm. Then, the test sample is pressurized at 15 kPa for three minutes. The test sample is taken out from the water, and water on the surface of the test sample is removed. A weight $W_2$ of the test sample is measured, and the open cell ratio $F_1$ and the closed cell ratio $F_2$ are determined according to the following formulae.

$$\text{Open cell ratio } F_1(\%) = 100 \times (W_2 - W_1)/V_2$$

$$\text{Closed cell ratio } F_2(\%) = 100 - F_1$$

Next, a method for producing the stretched thermoplastic resin foam sheet of the present invention is described. First, a thermoplastic resin and a pyrolytic foaming agent are charged into an extruder. The mixture is melt-kneaded and then extruded into a sheet shape to produce a foamable thermoplastic resin sheet.

The pyrolytic foaming agent is not specifically limited as long as it is decomposed by heating to generate gas. Examples thereof include azodicarbonamide, N'N-dinitrosopentamethylenetetramine, and p-toluenesulfonyl semicarbazide. Among these, azodicarbonamide is preferable. The pyrolytic foaming agents may be used alone, or two or more of them may be used in combination.

The amount of the pyrolytic foaming agent in the foamable thermoplastic resin sheet may be appropriately determined in accordance with the foaming ratio of the stretched thermoplastic resin foam sheet. The amount is preferably 1 to 40 parts by weight, more preferably 1 to 30 parts by weight, with respect to 100 parts by weight of the thermoplastic resin. When the additive amount of the pyrolytic foaming agent is too small, the foamability of the foamble thermoplastic resin sheet is lowered so that the stretched thermoplastic resin foam sheet having a desired foaming ratio may not be obtained. When the additive amount of the pyrolytic foaming agent is too big, foam in the stretched thermoplastic resin foam sheet may be broken.

The foamable thermoplastic resin sheet may contain additives as far as they do not impair the physical property of the stretched thermoplastic resin foam sheet. Examples of additives include an antioxidant such as 2,6-di-t-butyl-p-cresol, a foaming aid such as zinc oxide, a vapor bubble nucleus regulator, a heat stabilizer, a coloring agent, a fire retardant, an antistatic agent, and a filler.

The foamable thermoplastic resin sheet is cross-linked in a commonly-used method, if necessary. Exemplary methods of cross-linking the foamable thermoplastic resin sheet include: irradiating of the foamable thermoplastic resin sheet with ionizing radiations such as α rays, β rays, and γ rays; and preliminal blending of an organic peroxide to the foamable thermoplastic resin sheet and subsequent heating of the resulting foamable thermoplastic resin sheet to decompose the organic peroxide. These methods may be used in combination.

Examples of the organic peroxide include 1,1-bis(t-butylperoxy) 3,3,5-trimethylcyclohexane, 1,1-bis(t-butylperoxy) cyclohexane, 2,2-bis(t-butylperoxy) octane, n-butyl-4,4-bis(t-butylperoxy) valerate, di-t-butyl peroxide, t-butyl cumyl peroxide, dicumyl peroxide, α, α'-bis(t-butylperoxy-m-isopropyl) benzene, 2,5-dimethyl-2,5-di(t-butylperoxy) hexane, 2,5-dimethyl-2,5-di(t-butylperoxy) hexyne-3, benzoyl peroxide, cumyl peroxyneodecanoate, t-butyl peroxybenzoate, 2,5-dimethyl-2,5-di(benzoylperoxy) hexane, t-butylperoxy isopropyl carbonate, and t-butylperoxy allyl carbonate. The organic peroxides may be used alone, or two or more of them may be used in combination.

The additive amount of the organic peroxide is preferably 0.01 to 5 parts by weight and more preferably 0.1 to 3 parts by weight with respect to 100 parts by weight of the thermoplastic resin. When the additive amount of the organic peroxide is too small, cross-linking of the foamable thermoplastic resin sheet may be insufficient. When the additive amount of the organic peroxide is too big, a residue of the decomposed organic peroxide may be left in the resulting stretched thermoplastic resin foam sheet.

A method for foaming the foamable thermoplastic resin sheet is not specifically limited, and examples thereof include hot air heating, infrared heating, salt bath treatment, and oil bath treatment. These methods may be used in combination.

The thermoplastic resin foam sheet obtained by foaming the foamable thermoplastic resin sheet in the above-described manner is stretched in its width direction. The step of stretching the thermoplastic resin foam sheet in its width direction is repeatedly carried out for a plurality of times.

The method for stretching the thermoplastic resin foam sheet is not specifically limited. For example, the thermoplastic resin foam sheet is held at both ends in its width direction by a pair of holding devices and then the holding devices are moved in opposite directions so that the thermoplastic resin foam sheet is stretched in its width direction.

The stretched thermoplastic resin foam sheet of the present invention is produced by stretching the thermoplastic resin foam sheet in its width direction for a plurality of times. Accordingly, the thermoplastic resin foam sheet is already stretched during production of the stretched thermoplastic resin foam sheet. However, forsake of simplicity, every foam sheet during the production of the stretched thermoplastic resin foam sheet is referred to as a "thermoplastic resin foam sheet". Further, a "thermoplastic resin foam sheet" not only refers to a thermoplastic resin foam sheet obtained after foaming of a foamable thermoplastic resin sheet is completed, but also refers to a thermoplastic resin foam sheet obtained during foaming of a foamable thermoplastic resin sheet.

In the initial stretching step (hereinafter, referred to as "first stretching step") out of a plurality of stretching steps, the thermoplastic resin foam sheet is stretched by a stretching ratio of 1.1 to 2.0 times at a temperature at least 10° C. higher than the melting point or the softening point of the thermoplastic resin constituting the thermoplastic resin foam sheet.

The melting point of the thermoplastic resin refers to a temperature as measured in accordance with JIS K 7121. The softening point of the thermoplastic resin refers to a temperature as measured in accordance with JIS K7206. When the thermoplastic resin is a crystalline resin, the stretching temperature is determined by using the melting point as standard. Further, when the thermoplastic resin is an amorphous resin, the stretching temperature is determined by using the softening point as standard.

When the thermoplastic resin is a mixture of a crystalline resin and an amorphous resin, the stretching temperature of the thermoplastic resin foam sheet is determined by using the softening temperature of the amorphous resin as standard.

When the thermoplastic resin foam sheet is stretched after foaming of the foamable thermoplastic resin sheet is completed, the stretching ratio is calculated by using Formula 1.

Stretching ratio (%) of thermoplastic resin foam sheet=100×(Width of thermoplastic resin foam sheet when stretching is completed)/(Width of thermoplastic resin foam sheet when stretching is started)     Formula 1

On the other hand, when the thermoplastic resin foam sheet is stretched during the foaming of the foamable thermoplastic resin sheet, namely when the thermoplastic resin foam sheet to be obtained by foaming the foamable thermoplastic resin sheet is still foaming, the stretching ratio is calculated as below described.

First, the thermoplastic resin foam sheet obtainable by foaming the foamable thermoplastic resin sheet is stretched in its width direction during foaming. Here, a width $W_3$ of the thermoplastic resin foam sheet when stretching is started and a width $W_4$ of the thermoplastic resin foam sheet when stretching is completed are measured.

On the other hand, the thermoplastic resin foam sheet obtainable by foaming the foamable thermoplastic resin sheet is foamed under same conditions except that the thermoplastic resin foam sheet is not stretched in its width direction. Then, a width $W_5$ of the thermoplastic resin foam sheet when foaming is completed is measured.

The stretching ratio of the thermoplastic resin foam sheet is calculated by using Formula 2 below.

Stretching ratio (%) of thermoplastic resin foam sheet=100×($W_4$−$W_5$)/$W_3$     Formula 2

In the first stretching step, a stretching temperature $T_1$ (° C.) of the thermoplastic resin foam sheet is required to satisfy Formula 3 and is preferred to satisfy Formula 4 with respect to the melting point or softening point $T_2$ (° C.) of the thermoplastic resin constituting the thermoplastic resin foam sheet. When the stretching temperature $T_1$ (° C.) of the thermoplastic resin foam sheet is too low, the resulting stretched thermoplastic resin foam sheet has an uneven thickness. It is to be noted that the stretching temperature $T_1$ of the thermoplastic resin foam sheet refers to a surface temperature of the thermoplastic resin foam sheet.

Melting point or Softening point $T_2$+10° C.≦Stretching temperature $T_1$     Formula 3

Melting point or Softening point $T_2$+10° C.≦Stretching temperature $T_1$≦Melting point or Softening point $T_2$+50° C.     Formula 4

In the first stretching step, the stretching ratio by which the thermoplastic resin foam sheet is stretched is limited to 1.1 to 2.0 times, more preferably 1.3 to 1.8 times. When the stretching ratio is too low, the obtained thermoplastic resin foam sheet is thick. When the stretching ratio is too high, the thermoplastic resin foam sheet may be broken during the stretching.

After each stretching step that is carried out for a plurality of times, an annealing step is carried out in which the thermoplastic resin foam sheet is not stretched in the width direction. The annealing step is carried out under the same conditions as the preceding stretching step, except that stretching stress is not applied in the width direction of the thermoplastic resin foam sheet, and the temperature is maintained in the temperature range from the temperature 50° C. lower than the melting point or the softening point of the thermoplastic resin foam sheet to the temperature 10° C. higher than the melting point or the softening point of the thermoplastic resin foam sheet. The annealing step was carried out for releasing and removing the deformation formed in the thermoplastic resin foam sheet when stretched in its width direction so as to prevent shrinkage of the thermoplastic resin foam sheet.

A temperature $T_3$ of the thermoplastic resin foam sheet in the annealing step is required to satisfy Formula 5 and is preferred to satisfy Formula 6 with respect to the melting point/softening point $T_2$ (° C.) of the thermoplastic resin constituting the thermoplastic resin foam sheet. When the temperature $T_3$ of the thermoplastic resin foam sheet is too low, residual stress may be present in the obtained thermoplastic resin foam sheet. When the temperature $T_3$ of the thermoplastic resin foam sheet is too high, the obtained thermoplastic resin foam sheet is shrunk. The temperature $T_3$ of the thermoplastic resin foam sheet in the annealing step refers to a surface temperature of the thermoplastic resin foam sheet.

> Melting point or Softening point $T_2$−50° C.≦Stretching temperature $T_3$<Melting point or Softening point $T_2$+10° C.     Formula 5

> Melting point or Softening point $T_2$−30° C.≦Stretching temperature $T_3$≦Melting point or Softening point $T_2$+10° C.     Formula 6

In the annealing step, the thermoplastic resin foam sheet is preferably annealed for 30 seconds to 2 minutes. When the annealing time is too short, residual stress may be present in the obtained thermoplastic resin foam sheet. When the annealing time is too long, production efficiency may be lowered.

In the remaining stretching steps (hereinafter, referred to as "Second stretching step") other than the initial stretching step out of the plurality of stretching steps, the thermoplastic resin foam sheet is stretched under the stretching conditions different from those of the first stretching steps. Specifically, the thermoplastic resin foam sheet is stretched by the stretching ratio of 1.1 to 5.0 times in the temperature range from the temperature 50° C. lower than the melting point or the softening point of the thermoplastic resin constituting the thermoplastic resin foam sheet to the temperature 10° C. higher than the melting point or the softening point of the thermoplastic resin constituting the thermoplastic resin foam sheet.

A stretching temperature $T_4$ of the thermoplastic resin foam sheet in the second stretching step is required to satisfy Formula 7 and is preferred to satisfy Formula 8 with respect to the melting point or softening point $T_2$ (° C.) of the thermoplastic resin constituting the thermoplastic resin foam sheet. When the stretching temperature $T_4$ of the thermoplastic resin foam sheet is too low, residual deformation may be formed in the obtained thermoplastic resin foam sheet so that the dimensional stability of the thermoplastic resin foam sheet may be deteriorated. When the stretching temperature $T_4$ of the thermoplastic resin foam sheet is too high, the thermoplastic resin foam sheet may be broken during the stretching. The stretching temperature $T_4$ of the thermoplastic resin foam sheet refers to a surface temperature of the thermoplastic resin foam sheet.

> Melting point or Softening point $T_2$−50° C.≦Stretching temperature $T_4$<Melting point or Softening point $T_2$+10° C.     Formula 7

> Melting point or Softening point $T_2$−30° C.≦Stretching temperature $T_4$≦Melting point or Softening point $T_2$+10° C.     Formula 8

In the second stretching step, the stretching ratio by which the thermoplastic resin foam sheet is stretched is limited to 1.1 to 5.0 times, more preferably 1.1 to 3.0 times. When the stretching ratio is too low, the sufficient stretching effect may not be obtained in the thermoplastic resin foam sheet. When the stretching ratio is too high, the thermoplastic resin foam sheet may be broken during the stretching.

The annealing step is carried out after the thermoplastic resin foam sheet is stretched in the second stretching step. Then, the thermoplastic resin foam sheet is cooled in a cooling step. A method for cooling the thermoplastic resin foam sheet is not specifically limited. Blasting of cold air to the thermoplastic resin foam sheet may be employed, or alternatively, natural cooling may be employed.

It is to be noted that, in each of the first stretching step and the second stretching step of the thermoplastic resin foam sheet, the thermoplastic resin foam sheet during foaming or after the completion of the foaming may be used. Accordingly, the thermoplastic resin foam sheet during its foaming may be used in one or more stretching steps out of the plurality of the stretching steps, while the thermoplastic resin foam sheet after the completion of the foaming may be used in the subsequent stretching step. Further, in all the stretching steps, the thermoplastic resin foam sheet during foaming may be used. Or alternatively, in all the stretching steps, the thermoplastic resin foam sheet after the completion of the foaming may be used.

There has been described a case where the stretching step and the annealing step of the thermoplastic resin foam sheet are alternately and continuously carried out so that the thermoplastic resin foam sheet is continuously produced. However, a stretching and cooling step in which a thermoplastic resin foam sheet is stretched, annealed, and cooled may be carried out as a single step to the thermoplastic resin sheet repeatedly to produce a thermoplastic resin foam sheet.

Specifically, a foamable thermoplastic resin sheet is heated to a temperature higher than the decomposition temperature of the pyrolytic foaming agent in the foamable thermoplastic resin sheet to produce a thermoplastic resin foam sheet. A first stretching step under the above-described conditions is carried out to the obtained thermoplastic resin foam sheet. Then, an annealing step under the above-described conditions is carried out to the thermoplastic resin foam sheet. Thereafter, the thermoplastic resin foam sheet is cooled in the same manner as above described. These steps are included in a first stretching and cooling step. After the first stretching and cooling step, a second stretching and cooling step described below is carried out.

A second stretching step under the above-described conditions is carried out to the thermoplastic resin foam sheet. Then, an annealing step under the above-described conditions is carried out to the thermoplastic resin foam sheet. Thereafter, the thermoplastic resin foam sheet is cooled in the same manner as above described. These steps are included in a second stretching and cooling step. The second stretching and cooling step is carried out once or more than once to produce a stretched thermoplastic resin foam sheet.

It is to be noted that the thermoplastic resin foam sheet may be used during its foaming or after the completion of the foaming in each stretching and cooling step as above described.

In order to keep excellent flexibility and heat resistant property, the thermoplastic resin foam sheet preferably has a thickness of 0.1 to 1 mm, more preferably 0.2 mm or more and 0.8 mm or less. The stretched thermoplastic resin foam sheet preferably has a thickness of 0.05 to 0.5 mm, more preferably 0.06 to 0.3 mm.

Applications of a cross-linked polyolefin-based resin foam sheet obtained as above are not specifically limited. For example, an adhesive layer is integrally laminated at least on one surface of the stretched thermoplastic resin foam sheet and the resulting sheet may be used as an adhesive tape.

More specifically, an adhesive tape comprising the stretched thermoplastic resin foam sheet as a base material is used, for example, as an adhesive tape for removing irregularities on an uneven surface. Further, it may be used as a sealing material for electronic devices to prevent a shock on electronic components in the main body of an electronic device such as mobile phones and video cameras and to prevent entry of dust into the main body of an electronic device. In particular, since the thermoplastic resin foam sheet can maintain excellent flexibility and heat resistant property even the thickness is reduced, the thermoplastic resin foam sheet is suitably used in electronic devices which have been significantly downsized.

In a case where the cross-linked polyolefin-based resin foam sheet is used as a base substrate of the adhesive tape, the stretched thermoplastic resin foam sheet preferably has a thickness of 0.05 to 0.5 mm, more preferably 0.06 to 0.3 mm. When the stretched thermoplastic resin foam sheet is too thin, the flexibility and the tensile strength of the stretched thermoplastic resin foam sheet are lowered, resulting in deteriorated aesthetic property and mechanical strength of the obtained adhesive tape. Further improved performance of the adhesive tape is not expected from the thick stretched thermoplastic resin foam sheet so that economical efficiency is lowered.

An adhesive constituting the adhesive layer to be integrally laminated on one or both surfaces of the cross-linked polyolefin-based resin foam sheet is not specifically limited and the adhesive conventionally used in the adhesive tape may be used. Examples thereof include an acrylic adhesive, a urethane-based adhesive, and a rubber-based adhesive.

Examples of a method for integrally laminating an adhesive layer by applying an adhesive at least on one surface of the stretched thermoplastic resin foam sheet include: application of an adhesive at least on one surface of the stretched thermoplastic resin foam sheet with use of a coating device such as a coater; spraying of an adhesive at least on one surface of the stretched thermoplastic resin foam sheet; and application of an adhesive at least on one surface of the stretched thermoplastic resin foam sheet with use of a brush.

Effects of the Invention

The stretched thermoplastic resin foam sheet of the present invention is producible by stretching a thermoplastic resin foam sheet, and has a compressive strength of 1 to 500 kPa as measured in accordance with JIS K6767 when compressed in the thickness direction thereof to a thickness of 0.05 mm. Accordingly, the stretched thermoplastic resin foam sheet of the present invention has excellent flexibility even in a very thin state of being compressed in the thickness direction to a thickness of about 0.05 mm. As a result, the stretched thermoplastic resin foam sheet of the present invention is suitably used as a sealing material for a small electronic device such as mobile phones.

BEST MODE FOR CARRYING OUT THE INVENTION

The present invention will be more specifically described based on examples, but the present invention is not limited to these examples.

Example 1

An amount of 100 parts by weight of ethylene-vinyl acetate copolymers (produced by Tosoh Corporation, product name "Ultrathene 626", melting point: 91° C.), 3.1 parts by weight of azodicarbonamide, 0.3 parts by weight of 2,6-di-t-butyl-p-cresol as an antioxidant, and 1 part by weight of ZnO as a foaming aid were charged into an extruder. The mixture was melt-kneaded at 120° C. and then extruded to produce an elongated foamable thermoplastic resin foam sheet having a thickness of 0.3 mm and a width of 200 mm.

The obtained foamable thermoplastic resin foam sheet was continuously supplied to a foaming oven in which the temperature was maintained at 250° C. In the foaming oven, the foamable thermoplastic resin foam sheet was heated to foam so as to produce a thermoplastic resin foam sheet having a foaming ratio of 4.0 times, a thickness of 0.25 mm, and a width of 200 mm. Here, the ratio of the speed to supply the foamable thermoplastic resin sheet into the foaming oven and the speed to discharge the thermoplastic resin foam sheet from the foaming oven (Discharging speed/Supplying speed) was 2.5.

Next, the obtained thermoplastic resin foam sheet was heated until the surface temperature thereof reached 105° C. and the thermoplastic resin foam sheet was held at both ends in its width direction by a pair of holding devices. The holding devices were moved in opposite directions so that the thermoplastic resin foam sheet was stretched in the width direction by the stretching ratio of 1.6 times (First stretching step).

Then, the stretching force in the width direction was removed from the thermoplastic resin foam sheet, and the thermoplastic resin foam sheet was annealed by being kept for one minute to have a surface temperature of 100° C. (Annealing step).

Thereafter, the thermoplastic resin foam sheet was heated until the surface temperature thereof reached 95° C. and the thermoplastic resin foam sheet was held at both ends in its width direction by a pair of holding devices. The holding devices were moved in opposite directions so that the thermoplastic resin foam sheet was stretched in the width direction by the stretching ratio of three times (Second stretching step). Then, the stretching force in the width direction was removed from the thermoplastic resin foam sheet, and the thermoplastic resin foam sheet was annealed by being kept for one minute to have a surface temperature of 90° C. (Annealing step). The thermoplastic resin foam sheet was cooled until the surface temperature thereof reached at room temperature. As a result, a stretched thermoplastic resin foam sheet having a thickness of 0.07 mm was obtained.

Example 2

A stretched thermoplastic resin foam sheet having a thickness of 0.07 mm was obtained in the same manner as in Example 1 except that the amount of azodicarbonamide was changed from 3.1 parts by weight to 1.9 parts by weight to produce a thermoplastic resin foam sheet having a foaming ratio of 2.5 times, a thickness of 0.25 mm, and a width of 200 mm.

Example 3

A stretched thermoplastic resin foam sheet having a thickness of 0.1 mm was obtained in the same manner as in Example 1 except that the thermoplastic resin foam sheet was stretched by a stretching ratio of twice in the second stretching step.

Example 4

A stretched thermoplastic resin foam sheet having a thickness of 0.1 mm was obtained in the same manner as in Example 1 except that the amount of azodicarbonamide was changed from 3.1 parts by weight to 2.5 parts by weight to produce a thermoplastic resin foam sheet having a foaming ratio of 3.3 times, a thickness of 0.35 mm, and a width of 200 mm, and the thermoplastic resin foam sheet was stretched by a stretching ratio of twice in the second stretching step.

Example 5

A stretched thermoplastic resin foam sheet having a thickness of 0.07 mm was obtained in the same manner as in Example 1 except that: a polyethylene (produced by Japan Polyethylene Corporation, product name "KF670", density: 0.905 g/cm³, melting point: 97° C.) obtained by using a metallocene compound was used as a polymerization catalyst instead of ethylene-vinyl acetate copolymers; the thermoplastic resin foam sheet was heated until the surface temperature thereof reached 110° C. in the first stretching step; and the thermoplastic resin foam sheet was heated until the surface temperature thereof reached 100° C. in the second stretching step.

Example 6

A stretched thermoplastic resin foam sheet having a thickness of 0.07 mm was obtained in the same manner as in Example 1 except that: the amount of azodicarbonamide was changed from 3.1 parts by weight to 1.9 parts by weight; a polyethylene (produced by Japan Polyethylene Corporation, product name "KF670", density: 0.905 g/cm³, melting point: 97° C.) obtained by using a metallocene compound was used as a polymerization catalyst instead of ethylene-vinyl acetate copolymers; the thermoplastic resin foam sheet was heated until the surface temperature thereof reached 110° C. in the first stretching step; and the thermoplastic resin foam sheet was heated until the surface temperature thereof reached 95° C. in the second stretching step.

Example 7

A thermoplastic resin foam sheet having a foaming ratio of 4.0 times, a thickness of 0.25 mm, and a width of 200 mm was obtained in the same manner as in Example 1. Next, the obtained thermoplastic resin foam sheet was heated until the surface temperature thereof reached 105° C. and the thermoplastic resin foam sheet was held at both ends in its width direction by a pair of holding devices. The holding devices were moved in opposite directions so that the thermoplastic resin foam sheet was stretched in the width direction by the stretching ratio of 1.6 times (First stretching step).

Then, the stretching force in the width direction was removed from the thermoplastic resin foam sheet, and the thermoplastic resin foam sheet was annealed by being kept for one minute until the surface temperature thereof reached 100° C. (Annealing step). The thermoplastic resin foam sheet was cooled until the surface temperature thereof reached at room temperature.

Next, the thermoplastic resin foam sheet was heated until the surface temperature thereof reached 95° C. and the thermoplastic resin foam sheet was held at both ends in its width direction by a pair of holding devices. The holding devices were moved in opposite directions so that the thermoplastic resin foam sheet was stretched in the width direction by the stretching ratio of three times (Second stretching step). Then, the stretching force in the width direction was removed from the thermoplastic resin foam sheet, and the thermoplastic resin foam sheet was annealed by being kept for one minute until the surface temperature thereof reached 90° C. (Annealing step). The thermoplastic resin foam sheet was cooled until the surface temperature thereof reached at room temperature. As a result, a stretched thermoplastic resin foam sheet having a thickness of 0.07 mm was obtained.

Comparative Example 1

A polyurethane foam sheet having a thickness of 0.15 mm was used, which was commercially available from Rogers Inoac Corporation under the product name "SRS70P".

Comparative Example 2

A polyethylene terephtalate film having a thickness of 0.05 mm was used, which was commercially available from Toyobo Ester Film Co., Ltd. under the product name "E5100".

To each stretched thermoplastic resin foam sheet, the polyurethane foam sheet, and the polyethylene terephtalate film, measurement was carried out with respect to thickness, apparent density, compressive strength as measured in accordance with JIS K6767 when compressed in the thickness direction to a thickness of 0.05 mm, closed cell ratio, and water tightness by methods as previously described and described below. Table 1 shows the results.

(Apparent Density)

The apparent density of each stretched thermoplastic resin foam sheet was measured in accordance with JIS K6767.

(Water Tightness)

An acrylic adhesive (produced by SEKISUI FULLER Co., Ltd., product name "S-dine 7850") was applied to both surfaces of the stretched thermoplastic resin foam sheet in such a manner that the thickness after being dried is 25 μm, and then dried. The water tightness was measured in accordance with JIS C0920 (IPX7).

TABLE 1

|  | Example 1 | Example 2 | Example 3 | Example 4 | Example 5 | Example 6 | Example 7 | Comparative Example 1 | Comparative Example 2 |
| --- | --- | --- | --- | --- | --- | --- | --- | --- | --- |
| Thickness (mm) | 0.07 | 0.07 | 0.1 | 0.1 | 0.07 | 0.07 | 0.07 | 0.15 | 0.05 |
| Apparent density (g/cm³) | 0.27 | 0.43 | 0.27 | 0.33 | 0.27 | 0.43 | 0.27 | 0.7 | 1.3 |
| Compressive strength (kPa) | 30 | 80 | 150 | 300 | 40 | 110 | 30 | 20000 or more | 20000 or more |
| Closed cell ratio(%) | 90 | 90 | 90 | 90 | 90 | 90 | 90 | 0 | — |
| Watertightness | No water leak | No water leak | No water leak | No water leak | No water leak | No water leak | No water leak | Water leak | Water leak |

INDUSTRIAL APPLICABILITY

The stretched thermoplastic resin foam sheet of the present invention is usable, for example, as a base material of an adhesive tape. The adhesive tape comprising the stretched thermoplastic resin foam sheet is usable, for example, for removing irregularities or as a sealing material.

The invention claimed is:

1. A method for producing a stretched thermoplastic resin foam sheet, comprising:
   a first stretching step for stretching a thermoplastic resin foam sheet in a width direction thereof by a stretching ratio of 1.1 to 2.0 times at a temperature at least 10° C. higher than a melting point or a softening point of the thermoplastic resin foam sheet, wherein the thermoplastic resin foam sheet is obtained by heating a foamable thermoplastic resin sheet containing a thermoplastic resin and a pyrolytic foaming agent to a decomposition temperature of the pyrolytic foaming agent or higher, and wherein a closed cell ratio of the thermoplastic resin foam sheet is 50% or more;

a first annealing step not for stretching the thermoplastic resin foam sheet in the width direction thereof at a temperature in a range from 50° C. lower than the melting point or the softening point of the thermoplastic resin foam sheet to 10° C. higher than the melting point or the softening point of the thermoplastic resin foam sheet, wherein the first annealing step is carried out after the first stretching step;

a second stretching step for stretching the thermoplastic resin foam sheet in a width direction thereof by a stretching ratio of 1.1 to 5.0 times at a temperature in a range from 50° C. lower than the melting point or the softening point of the thermoplastic resin foam sheet to 10° C. higher than the melting point or the softening point of the thermoplastic resin foam sheet, wherein the second stretching step is carried out once or more than once after the first annealing step; and a second annealing step not for stretching the thermoplastic resin foam sheet in the width direction thereof at a temperature in a range from 50° C. lower than the melting point or the softening point of the thermoplastic resin foam sheet to 10° C. higher than the melting point or the softening point of the thermoplastic resin foam sheet, wherein the second annealing step is carried out after each second stretching step.

\* \* \* \* \*